(12) United States Patent
Diard

(10) Patent No.: US 8,106,913 B1
(45) Date of Patent: *Jan. 31, 2012

(54) GRAPHICAL REPRESENTATION OF LOAD BALANCING AND OVERLAP

(75) Inventor: Franck R. Diard, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/323,363

(22) Filed: Nov. 25, 2008

Related U.S. Application Data

(63) Continuation of application No. 11/153,931, filed on Jun. 15, 2005, now Pat. No. 7,456,833.

(51) Int. Cl.
*G06F 15/80* (2006.01)
*G06F 15/16* (2006.01)
*G06F 9/46* (2006.01)

(52) U.S. Cl. .................. 345/505; 345/502; 718/105

(58) Field of Classification Search .................. 345/440, 345/440.1, 440.2, 501, 502, 505, 522; 718/105
See application file for complete search history.

(56) References Cited

U.S. PATENT DOCUMENTS

| | | | |
|---|---|---|---|
| 5,293,480 A | 3/1994 | Miller et al. | |
| 5,790,130 A | 8/1998 | Gannett | |
| 5,841,444 A | 11/1998 | Mun et al. | |
| 6,023,381 A | 2/2000 | Grigor et al. | |
| 6,078,339 A | 6/2000 | Meinerth et al. | |
| 6,191,800 B1 | 2/2001 | Arenburg et al. | |
| 6,259,461 B1 | 7/2001 | Brown | |
| 6,266,072 B1 | 7/2001 | Koga et al. | |
| 6,317,133 B1 | 11/2001 | Root et al. | |
| 6,362,818 B1 | 3/2002 | Gardiner et al. | |
| 6,445,391 B1 | 9/2002 | Sowizral et al. | |
| 6,469,746 B1 | 10/2002 | Maida | |
| 6,473,086 B1 | 10/2002 | Morein et al. | |
| 6,570,571 B1 | 5/2003 | Morzumi | |
| 6,724,390 B1 | 4/2004 | Dragony et al. | |
| 6,747,654 B1 | 6/2004 | Laksono et al. | |
| 6,781,590 B2 | 8/2004 | Katsura et al. | |
| 6,952,217 B1 | 10/2005 | Diard et al. | |

(Continued)

FOREIGN PATENT DOCUMENTS

EP    0571969 A2    12/1993

OTHER PUBLICATIONS

Graphic Remedy; "gDebugger Screen Shots"; www.gremedy.com/screenshots.php; Jul. 23, 2004; pp. 1-4.

(Continued)

*Primary Examiner* — Joni Hsu
(74) *Attorney, Agent, or Firm* — Kilpatrick Townsend & Stockton LLP

(57) ABSTRACT

Circuits, methods, and apparatus for graphically displaying performance metrics of processors such as graphics processing units in multiple processor systems. Embodiments of the present invention may provide metric information regarding operations in alternate-frame rendering, split-frame rendering, or other modes of operation. One embodiment of the present invention provides data in split-frame rendering mode including load balancing, graphics processing unit utilization, frame rate, and other types of system information in a graphical manner. Another exemplary embodiment of the present invention provides graphical information regarding graphics processing unit utilization, frame rate, and other system information while operating in the alternate-frame rendering mode.

10 Claims, 8 Drawing Sheets

U.S. PATENT DOCUMENTS

| | | |
|---|---|---|
| 6,956,579 B1 | 10/2005 | Diard et al. |
| 7,015,915 B1 | 3/2006 | Diard |
| 7,075,541 B2 | 7/2006 | Diard |
| 7,095,416 B1 | 8/2006 | Johns et al. |
| 7,333,114 B2 | 2/2008 | Andrews et al. |
| 7,456,833 B1 | 11/2008 | Diard |
| 7,522,167 B1 | 4/2009 | Diard et al. |
| 2001/0002124 A1* | 5/2001 | Mamiya et al. ............... 345/132 |
| 2003/0128216 A1 | 7/2003 | Walls et al. |
| 2004/0008200 A1 | 1/2004 | Naegle et al. |
| 2004/0075623 A1 | 4/2004 | Hartman |
| 2005/0012749 A1 | 1/2005 | Gonzalez |
| 2005/0088445 A1 | 4/2005 | Gonzalez |
| 2005/0190190 A1 | 9/2005 | Diard et al. |
| 2006/0055701 A1 | 3/2006 | Taylor et al. |
| 2006/0267993 A1 | 11/2006 | Hunkins et al. |

OTHER PUBLICATIONS

Justice, Brent; "NVIDIA SLI Upgrade Guide" Dec. 13, 2004. www.HardOCP.com; pp. 1-9.

Molnar, Steven et al.; "PixelFlow: High-Speed Rendering Using Image Composition"; 1992, *Computer Graphics*, vol. 26, No. 2, pp. 231-240.

Whitman, Scott; "Dynamic Load Balancing for Parallel Polygon Rendering"; 1994 *IEEE Computer Graphics and Applications*, vol. 14, No. 4, pp. 41-48.

Computer Graphics, 26, Jul. 2, 1992 "PixelFlow: High-Speed Rendering using Image Composition", by Steven Molnar et al. pp. 231-240.

\* cited by examiner

GRAPHICAL REPRESENTATION OF LOAD BALANCING AND OVERLAP

The present disclosure is a continuation of U.S. patent application Ser. No. 11/153,931, filed Jun. 15, 2005, now U.S. Pat. No. 7,456,833, and is related to commonly-assigned co-pending U.S. patent applications Nos. 10/639,893, filed Aug. 12, 2003, titled "Programming Multiple Chips from a Command Buffer," and No. 10/642,905, filed Aug. 18, 2003, titled "Adaptive Load Balancing in a Multi-Processor Graphics Processing System," which are all incorporated by reference.

BACKGROUND

The present invention relates generally to graphically presenting information regarding the performance of multi-processor systems and in particular to the graphical representation of load balancing and graphics processor utilization in systems employing multiple graphics processors.

Graphics processing subsystems are designed to render graphical images for computer, gaming, and other electronic systems. These subsystems typically include a graphics processing unit (GPU), which is a highly complex integrated circuit device optimized to perform graphics computations, and its memory, which is referred to as a graphics memory.

To meet ever increasing demands for realism and speed, some GPUs include more transistors than typical central processing units (CPUs). In addition, graphics memories have become quite large in order to improve system speed by reducing traffic on a system bus; some graphics cards now include as much as 512 MB of memory. But despite these advances, a demand for even greater realism and faster rendering persists.

As one approach to meeting this demand, NVIDIA Corporation of San Jose, Calif., has developed state of the art multichip SLI™ graphics processing subsystems, in which two or more GPUs operate in parallel. Parallel operation substantially increases the number of rendering operations that can be carried out without requiring significant advances in GPU design.

When multiple processors operate in parallel, it is desirable that each perform a unique set of processing steps. That is, it is desirable that the multiple processors do not perform redundant tasks. When fewer redundant tasks are performed, the efficiency of each processor is increased, and the benefits that come from using multiple processors is realized to a greater extent.

Thus, knowledge of each processor's operating efficiency and the extent to which the use of multiple processors improves a graphics' system performance is of interest to end users, program developers, and others. Accordingly, it is desirable to provide data such as system performance and load balancing information. Further, it is desirable to present this information in a graphical manner that can be quickly and easily understood.

SUMMARY

Accordingly, embodiments of the present invention provide circuits, methods, and apparatus for graphically displaying performance metrics in a graphics system employing multiple processors. Embodiments of the present invention may provide metric information regarding various modes of operation. One embodiment of the present invention provides data including load balancing, graphics processing unit utilization, frame rate, and other types of system information in a graphical manner when the system is operating in the split-frame rendering mode. Another exemplary embodiment of the present invention provides processor utilization, frame rate, and other system information while operating in the alternate-frame rendering mode. The information may be real-time, or cumulative or historical in nature.

These and other embodiments of the present invention provide a mode where one or more processing units in a multi-processor system is shut down. The system continues to operate with a diminished number of processors. This may be done in order to provide a basis of comparison in performance, or to reduce system power dissipation when one or more processors are not needed to render an image for display.

Systems that may be improved by embodiments of the present invention may include two or more processors. These processors may be graphics processing units, general processing units, or other types or combinations of processing circuits. Various embodiments of the present invention provide one or more of these and the various features described herein.

A better understanding of the nature and advantages of the present invention may be gained with reference to the following detailed description and the accompanying drawings.

DESCRIPTION OF EXEMPLARY EMBODIMENTS

Figure 1:
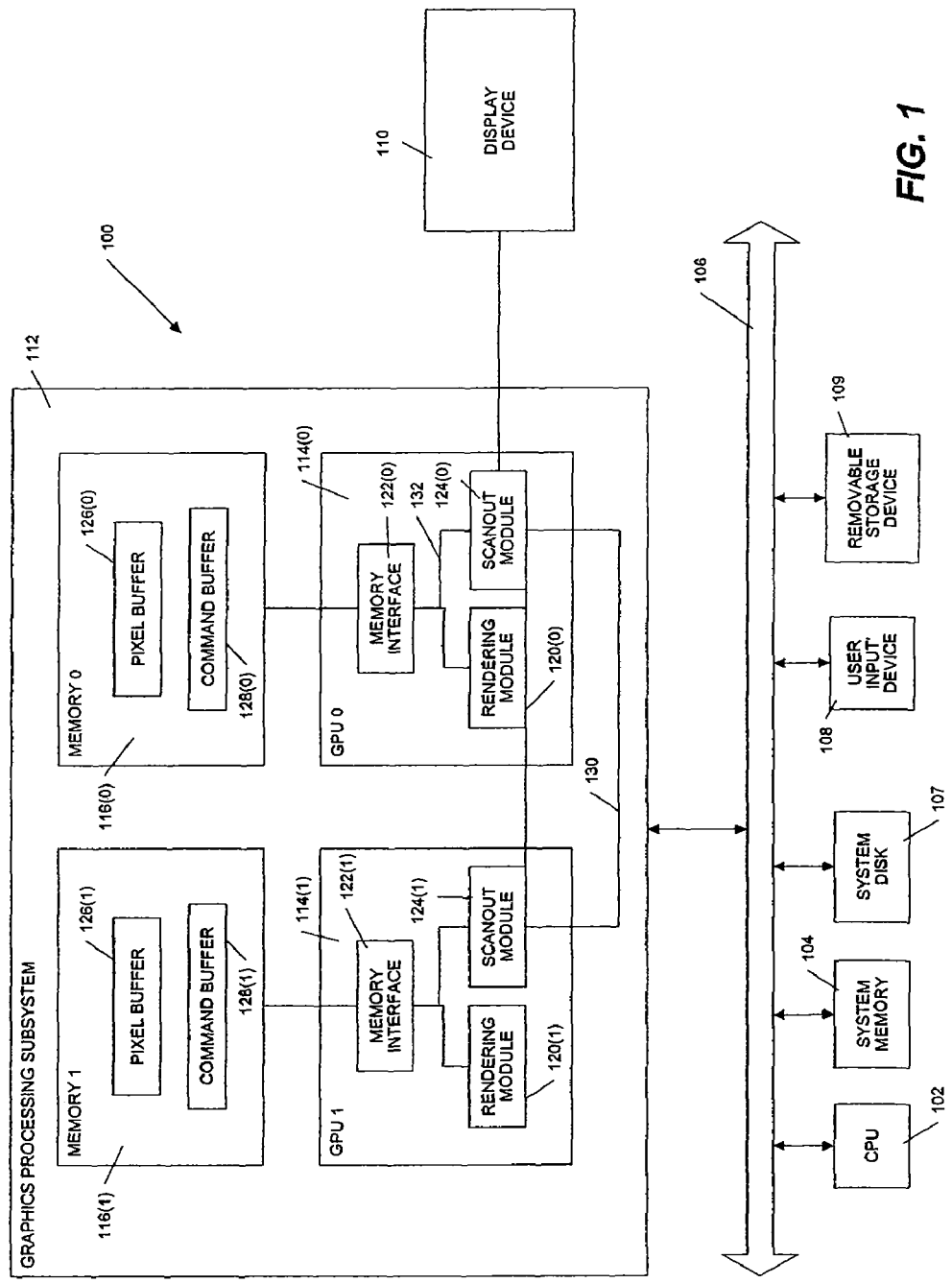
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus 106. User input is received from one or more user input devices 108, such as a keyboard or mouse, coupled to bus 106. Visual output is provided on a display device 110 such as a conventional CRT or LCD based monitor, operating under control of a graphics processing subsystem 112 coupled to system bus 106. A system disk 107 and other components, such as one or more removable storage devices 109 (e.g., floppy disk drive, compact disk (CD) drive, and/or DVD drive), may also be coupled to system bus 106.

Graphics processing subsystem 112 includes two or more graphics processing units 114, each with its own graphics memory 116, though in other embodiments these memories can be shared. GPUs 114 and memories 116 may be implemented using one or more integrated circuit devices such as programmable processors, application specific integrated circuits (ASICs), and memory devices. In one embodiment, graphics processing subsystem 112 is implemented using one or more expansion cards adapted to be connected to an appropriate bus slot (e.g., PCI-E) on a motherboard of system 100.

Each of GPUs 114 includes a rendering module 120, a memory interface module 122, and a scanout module 124. Rendering modules 120 may be configured to perform various tasks related to generating pixel data from graphics data supplied via system bus 106, interacting with respective graphics memories 116 to store and update pixel data, and the like. Rendering modules 120 generate pixel data from 2-D or 3-D scene data provided by various programs executing on CPU 102.

Memory interface modules 122, which communicate with respective rendering modules 120 and scanout modules 124, manage interactions with respective graphics memories 116. Each memory interface module 122 may also include pathways for writing pixel data received from system bus 106 to the respective graphics memory 116 without processing by rendering module 120.

Graphics memories 116 may be implemented using one or more integrated circuit memory devices of generally conventional design. The graphics processing subsystem may include any amount of dedicated graphics memory 116 (some implementations may have no dedicated graphics memory) and may use system memory and dedicated graphics memory 116 in any combination, and may each contain various physical or logical subdivisions, such as a pixel buffer 126 and a command buffer 128. Each pixel buffer 126 stores pixel data for an image (or for a part of an image) that is read and processed by the respective scanout module 124 and transmitted to display device 110 for display. This pixel data may be generated from 2-D or 3-D scene data provided to rendering modules 120 of GPUs 114 via system bus 106 or by various processes executing on CPU 102 and provided to one or more of pixel buffers 126 via system bus 106. Pixel buffers 126 are advantageously each double buffered so that while data for a first image is being read for display from a front frame buffer, data for a second image can be written to a back frame buffer without affecting the currently displayed image.

Command buffers 128 are used to queue commands received via system bus 106 for execution by respective rendering modules 120 and/or scanout modules 124, as described below.

Other portions of graphics memories 116 may be used to store data required by GPUs 114, such as texture data, color lookup tables, executable program code for GPUs 114, and so on.

Scanout modules 124 read pixel color data from pixel buffers 126 and transfer the data to display device 110 to be displayed. In one embodiment, scanout modules 124 operate isochronously, scanning out frames of pixel data at a prescribed refresh rate (e.g., 80 Hz) regardless of any other activity that may be occurring in GPUs 114 or elsewhere in system 100. In some embodiments, the prescribed refresh rate can be a user selectable parameter, and the scanout order may be varied as appropriate to the display format (e.g., interlaced or progressive scan).

It will be appreciated that the system described herein is illustrative and that variations modifications are possible. A GPU may be implemented as one or more integrated circuit devices, and different GPUs of a multi-processor graphics system might or might not be identical in structure, capabilities, and operation. Any or all of the GPUs or other components may be mounted on an expansion card, mounted directly on a system motherboard, or integrated into a system chipset component (e.g., into the Northbridge chip of one commonly used PC system architecture, or a more advanced Integrated Graphics Processor (IGP) type device available from NVIDIA Corporation of San Jose, Calif.). Graphics processing subsystems can be implemented using one or more expansion cards adapted for various bus standards, including PCI, PCI-E, AGP, and so on. In one embodiment, all of the GPUs are mounted on one expansion card. In another embodiment, different GPUs are mounted on different interconnected expansion cards. The cards may be interconnected using a system bus (e.g., PCI-E), or a special card-to-card connector may be provided.

Also, while in this and the other figures, the processors are shown as being graphics processing units or GPUs, other types of processors may be used. For example, general purpose processors may be used. Other types of processors, for example processors having generalized and specialized processing paths may be used. For example, processors including a non-specific processing circuit and processing circuit that is specialized for graphics application may be used. Also, general purpose processors or other types of processors can be used. These processors may be combined in any appropriate manner.

Interconnection between the GPUs may also be modified. For instance, a bridge unit might be provided to interconnect GPUs. A bridge unit, which can be in a separate chip or integrated with one of the GPUs, receives incoming data from system bus 106 and distributes it appropriately (e.g., to all GPUs or to those GPUs identified by a sub-device mask). Another bridge unit might be provided to manage selection among candidate pixels during scanout.

Graphics processing subsystems embodying the present invention may be incorporated into a variety of devices, including general purpose computer systems, video game consoles and other special purpose computer systems, DVD players, handheld devices such as mobile phones or personal digital assistants, and so on.

In a multi-chip system, the processing burden may be divided among the GPUs in various ways. In the split-frame rendering mode, multiple GPUs 114 operate in parallel to render different portions of an image for display device 110. Each GPU renders pixel data for a different portion of the displayable image, such as a number of lines of a raster-based display. The image portions may correspond to horizontal bands, vertical bands, or other divisions as desired.

Ideally, the display area (or screen) is partitioned in such a way that each GPU requires an equal amount of time to render its portion of the image. If the rendering times are unequal, a GPU that finishes its portion of the frame first will be idle, wasting valuable computational resources. In general, simply partitioning the display area equally among the GPUs is not an optimal solution because the rendering complexity of different parts of an image can vary widely. For example, in a typical scene from a video game, the foreground characters and/or vehicles—which are often complex objects rendered from a large number of primitives—tend to appear near the bottom of the image, while the top portion of the image is often occupied by a relatively static background that can be rendered from relatively few primitives and texture maps. When such an image is split into top and bottom halves, the GPU that renders the top half will generally complete its portion of the image, then wait for the other GPU to finish. To avoid this idle time, it is desirable to divide the display area unequally, with the top portion being larger than the bottom portion. In general, the optimal division depends on the particular scene being rendered and may vary over time even within a single video game or other graphics application.

Figure 2:
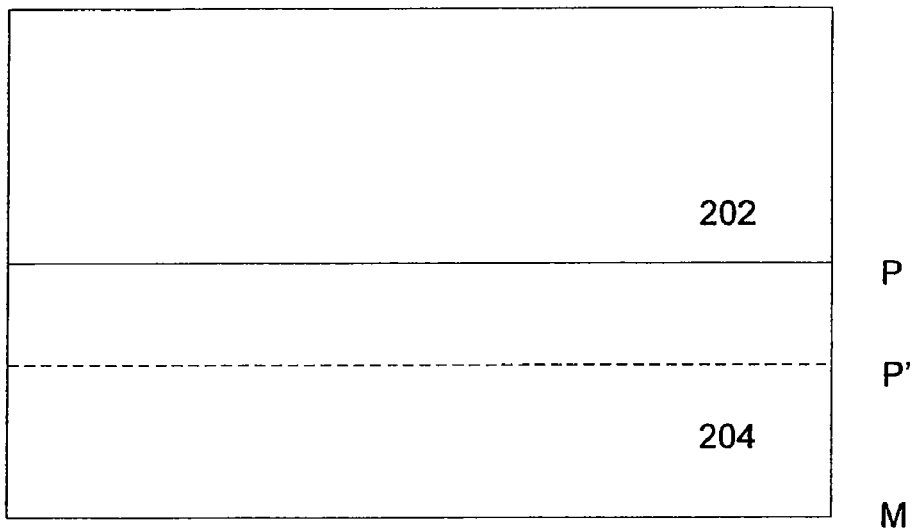
FIG. 2 illustrates an image rendered by two processors operating in a split-frame rendering mode.

FIG. 2 illustrates an image rendered by two graphics processors operating in a split-frame rendering mode. A display area 200 consists of M lines or horizontal rows of pixel data. Lines 1 through P, corresponding to top portion 202 of display area 200, are rendered by GPU 114(0) of FIG. 1, while lines P+1 through M, corresponding to bottom portion 204 of display area 200, are rendered by GPU 114(1). The area rendered by one GPU is referred to as a clip rectangle.

In one embodiment of the present invention, each GPU provides feedback data to the graphics driver program, or other program executing on CPU 102. The feedback data provides information about the time taken by a particular GPU to render its portion of the image. The graphics driver program uses this feedback to dynamically balance the load among the GPUs by modifying the clip rectangle from time to time, that is, by changing the dividing line to a different line P', based on the relative processing load and rendering completion time of the two GPUs.

Figure 3:
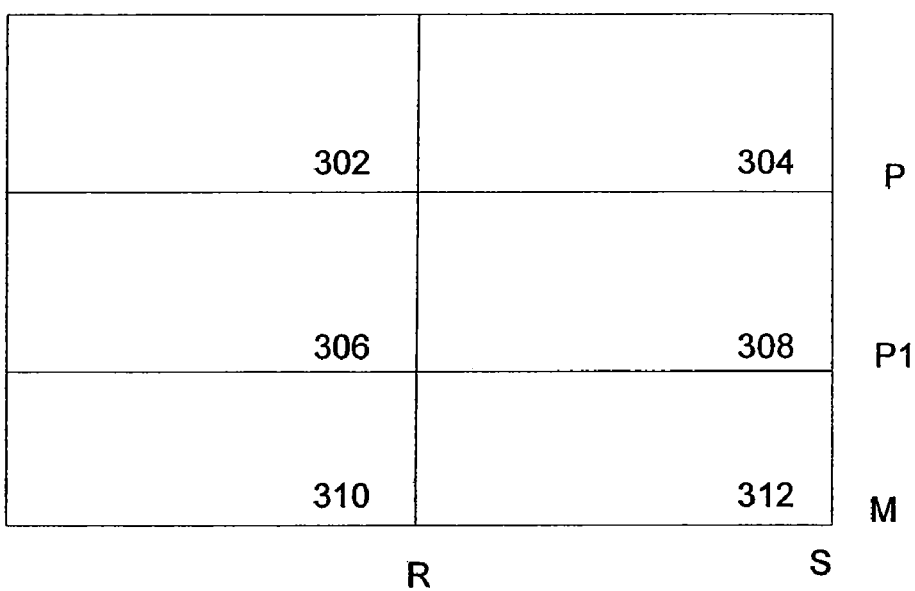
FIG. 3 illustrates an image rendered by "N" processors operating in a split-frame rendering mode.

FIG. 3 illustrates an image rendered by "N" graphics processors operating in a split-frame rendering mode. Again, a display area 300 consists of M lines or horizontal rows of pixel data, where each row is N pixels in length. In this example, the first R pixels in the first P rows (302) are rendered by one GPU, while pixels R+1 though S in the first P rows (304) are rendered by a second GPU. Similarly, display areas 306, 308, 310, and 312 are rendered by other GPUs. In other embodiments, the display area 300 may be split only horizontally. In other embodiments of the present invention, the number of vertical and horizontal divisions may vary from no divisions to any number N divisions. Some or all of these divisions or boundaries may be varied to properly balance the computational load among the GPUs.

Figure 4:
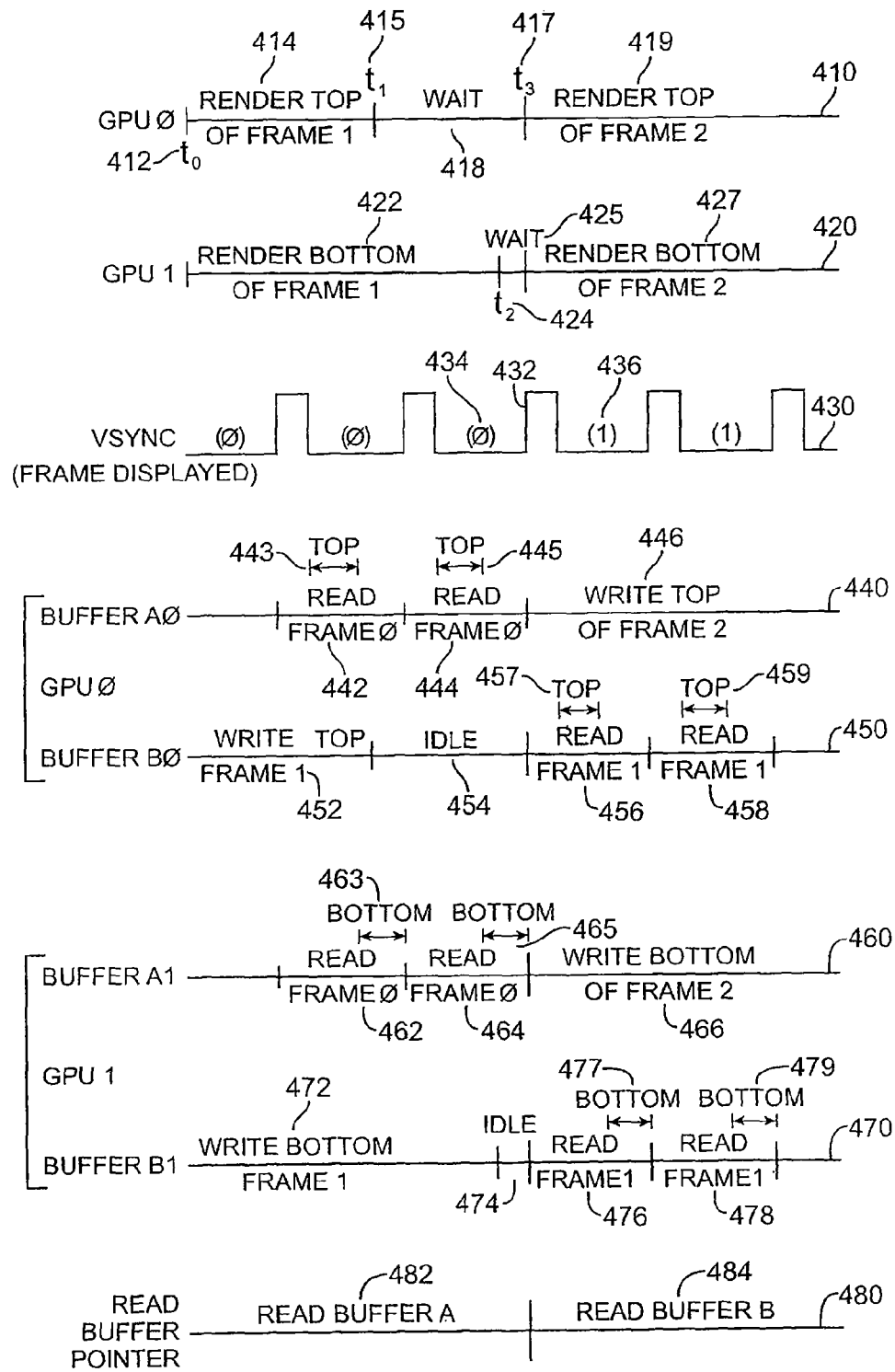
FIG. 4 is a timing diagram illustrating the operation of a graphics system consistent with an embodiment of the present invention operating in a split frame rendering mode.

FIG. 4 is a timing diagram illustrating the operation of a graphics system consistent with an embodiment of the present invention. Operations performed by two GPUs operating in the split-frame mode during the rendering of two frames of an image are shown. Timeline 410 illustrates the operation of a first GPU, while a second timeline 420 illustrates the operation of a second GPU. Also included is a vertical blanking or vertical synchronizing signal VSYNC 430, as well as the operations performed by front and back buffers used by the two GPUs. The operations of the two buffers used by GPU0 are illustrated as timelines 440 and 450, while the operations of the buffers used by GPU1 are shown as timelines 460 and 470. Also shown is the state of a read buffer pointer 480, which shows the set of buffers that are read from to generate an image by a scanout engine.

At time T0 412, GPU0 begins to render the top of frame F1. This task is completed by GPU0 at time T1 415. Similarly, at time T0 412, the task of rendering the bottom of frame F1 is begun by GPU1. This rendering is complete at time T2 424. During this period, the rendered data is a written to the "B" buffers, shown as 452 and 472. Specifically, GPU0 writes to top of frame F1 414 to buffer B0 during time 452, while GPU 1 writes the bottom of frame F1 422 to buffer B1 during time 472.

While the "B" buffers are being written to, the "A" buffers are being read from and their data is used to generate an image on a display. Accordingly, it is not desirable to write to the "A" buffers, as this may cause "tearing" of the image or other visual distortions. It is also not desirable to overwrite data in the "B" buffers since this data has just been rendered and not yet used. Accordingly, GPU0 and GPU1 wait until time T3 417 before rendering the next frame.

Specifically, at time T1 415, GPU0 has completed rendering the top of frame F1. At this point, GPU1 has not completed rendering the bottom of frame F1, so GPU0 enters a wait state 418. At time T2 424, the rendering of the bottom of frame F1 during time 422 is completed by GPU1. However, frame 0 is still being read out of buffers A0 during time 444 and A1 during time 464. Accordingly, GPU0 and GPU1 wait until T3 417 to begin rendering the next frame. At time T3 417, the rising edge 432 of HSYNC occurs. Following this rising edge is a blank time where pixels are not displayed. Accordingly, during this blanking, the buffers may be flipped. Specifically, data is now written to buffer A0 by GPU0 and to buffer A1 by GPU1. Simultaneously, data is read from buffer B0 and B1.

At this point, frame F2 is rendered. Specifically, the top of frame F2 is granted by GPU0 during time 418, and the bottom of frame F2 is rendered by GPU1 during time 427.

Data is read from buffer A0 and A1 during times 442 and 462. However, these buffers only contain valid data for the top and bottom of the frame respectively. For this reason, though data is read from both buffers, the top of frame 0 is used during time 443 and the bottom is used during time 463 to complete frame 0 for the display. Any remaining data in buffer A0 and buffer A1 are not used. Again, in a specific embodiment of the present invention, data read from these buffers form two data streams into a pixel mux or multiplexer which selects and directs one of the streams to a display.

As can be seen, both of the GPUs render for a first duration, then wait for a second duration. Specifically, in the illustrated example, the GPUs wait and do not render for the first blanking period after both GPUs have completed rendering their portion of a frame. Accordingly, their efficiency is often less than 100 percent.

It is of interest to users, program designers, hardware designers, and others, to know the increase in system performance that comes about because of the inclusion of more than one GPU in a specific graphics system. That is, if a user has invested money in a two GPU system, the user may be interested to visually see an indication of increased performance. Such graphical image can justify the expenditure to the user, and convince others of the value of multiple GPUs.

Specifically, if two GPUs are operating, but each are operating at less than 50 percent efficiency, little gain is created by the inclusion of the second GPU. However, if both GPUs are operating near 100 percent, that is the wait times 418 and 425 are near zero in duration, then nearly twice the number of frames per second are provided to the display as compared to a single GPU system.

Accordingly, it is desirable to illustrate efficiency, frame rate, work load distribution, and other performance metrics for the GPUs in this system. For example, the time rendering the top of frame F1, duration 414 may be compared to the wait time, duration 418. This comparison provides an indication of the efficiency of operation or utilization of GPU0. Other examples of efficiency information include a ratio that compares the rendering time, duration 414 to the sum of the rendering and wait times 414 and 418 may be of interest. Similarly, a ratio that compares the time needed to render the bottom of frame F1, duration 422 to the sum of the rendering and wait time, durations 442 and 425 may be of interest. The sum of the rendering times of both GPU0 and GPU1, durations 414 and 422 divided by the cumulative sum of the rendering and wait times, durations 414, 418, 422, and 425, may be also or alternately be shown. This information may be illustrated graphically on the display itself. Other data, such as lines illustrating the positions of lines P and P' in FIG. 2 may be also or alternately displayed. Further, other metrics, such as frame rate may also or alternately be displayed.

Various embodiments also provide a switch or other mechanism whereby one or more GPUs may be disabled or otherwise not used. For example, in a system with two GPUs, one GPU may be shut off or otherwise not used in the rendering of displayed frames. In this case, the image generated by two GPUs may be compared to the image generated by one GPU. Similarly, the above metrics may be illustrated for the cases of one or two GPUs to provide a basis of comparison. Similar embodiments extend this concept to 3, 4, or more GPUs.

Furthermore, particularly in mobile applications, if an image to be rendered is simple enough that one or more GPUs are not needed, those GPUs can be powered down, not clocked, or otherwise not used such that power is saved. For example, in a two GPU system, if only GPU is needed to fully render an image, for example a text document or spreadsheet, the other GPU can be powered down to save energy or battery time. The disabling of a GPU may be done by software, hardware, or combination thereof, or by a user.

Figure 5:
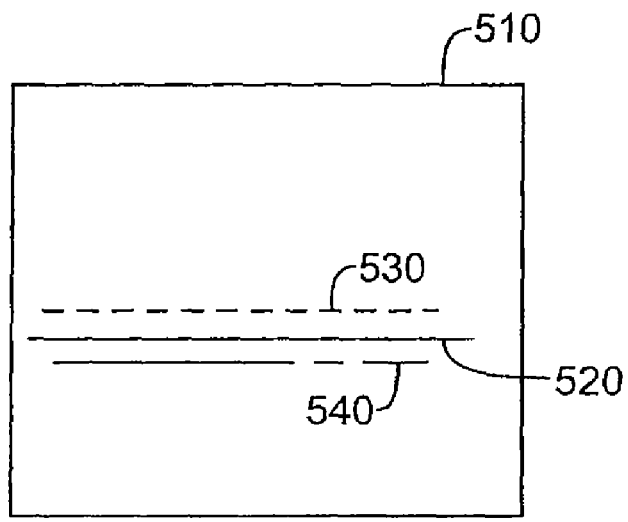
FIG. 5 illustrates a method of graphically representing load balancing done by a system according to an embodiment of the present invention.

FIG. 5 illustrates a method of graphically representing load balancing done by a system according to an embodiment of the present invention. This figure includes a display 510 and a line 520. The line 520 indicates the dividing line between the portion of the frames being rendered by a first graphics processing unit and those being rendered by a second graphics processing unit.

This line may change as a function of time. The manner in which this line changes as a function of time may also be of interest. Accordingly, previous or earlier dividing lines 530 and 540 may also be shown on the display 510, for example in lighter or different colors.

Figure 6:
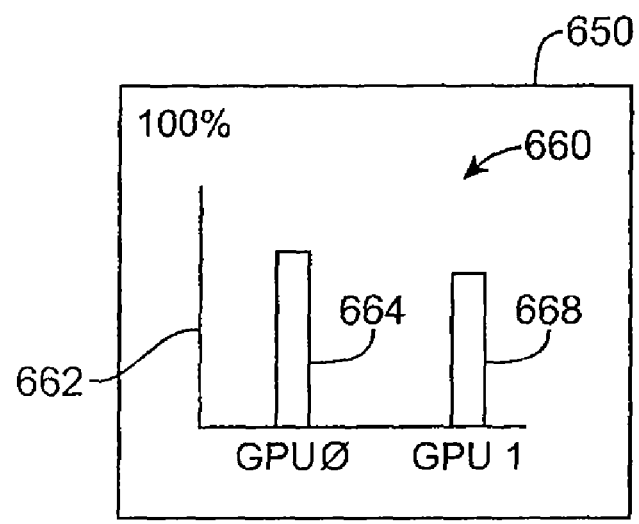
FIG. 6 illustrates a method of graphically representing processor usage according to an embodiment of the present invention.

FIG. 6 illustrates a method of graphically representing graphics processor usage according to an embodiment of the present invention. This figure includes a display 650, showing a graph 662. The graph illustrates efficiency of a first and second GPU 664 and 668. These efficiencies may be expressed as a percentage. For example, if the wait times 418 and 425 are near zero or very short, the efficiencies of the GPUs approach 100 percent. Conversely, if the GPUs are rendering for only a short time, for instance in a workstation type application, the efficiency of the GPU's may be very low.

This and other metrics may be shown in real-time, that is, they may be constantly updated. Alternately, they may be illustrated periodically, for example in a cumulative or historical manner. For example, the average efficiency over a large number of frames may be displayed in a cumulative manner. Historical data, for example, the last several cumulative averages may be displayed in order to indicate a trend in the change in efficiency over time. Any of the above examples of efficiency metrics may be displayed in this or other appropriate manner. Also, other efficiency metrics may be determined and displayed by embodiments of the present invention.

Again, in the above examples, frames are rendered using the technique known as split-frame rendering. A second processing workload sharing technique is referred to as alternate-frame rendering (AFR). In this technique, frames to be displayed are rendered sequentially by different graphics processing units. For example, where two GPUs are used, alternating frames are rendered by each GPU, with one GPU rendering odd-numbered frames, the other rendering even-numbered frames. In AFR operation, there is no load balancing to be done, since the processing load on each GPU is set by the frame to be rendered.

Different systems that may benefit by embodiments of the present invention may employ AFR while other may use SFR. Further, some systems may alternate or switch between AFT and SFR depending on the application that is running at any one time.

Figure 7:
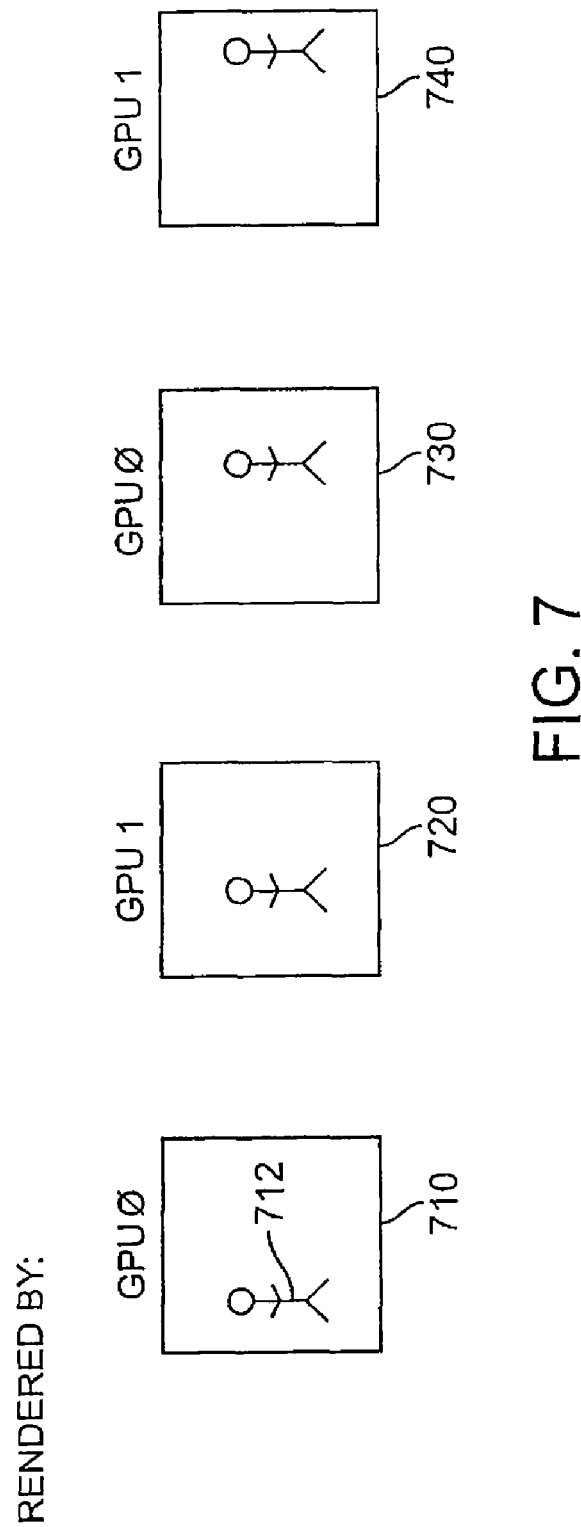
FIG. 7 illustrates a division of processing workload between two processors in a graphics system using alternate-frame rendering.

FIG. 7 illustrates the division of processing workload in a two GPU graphics system using alternate-frame rendering. This figure includes a series of frames 710, 720, 730, and 740. Alternating frames are rendered by different GPUs. Specifically, GPU0 renders frames 710 and 730, while GPU1 renders frames 720 and 740.

Figure 8:
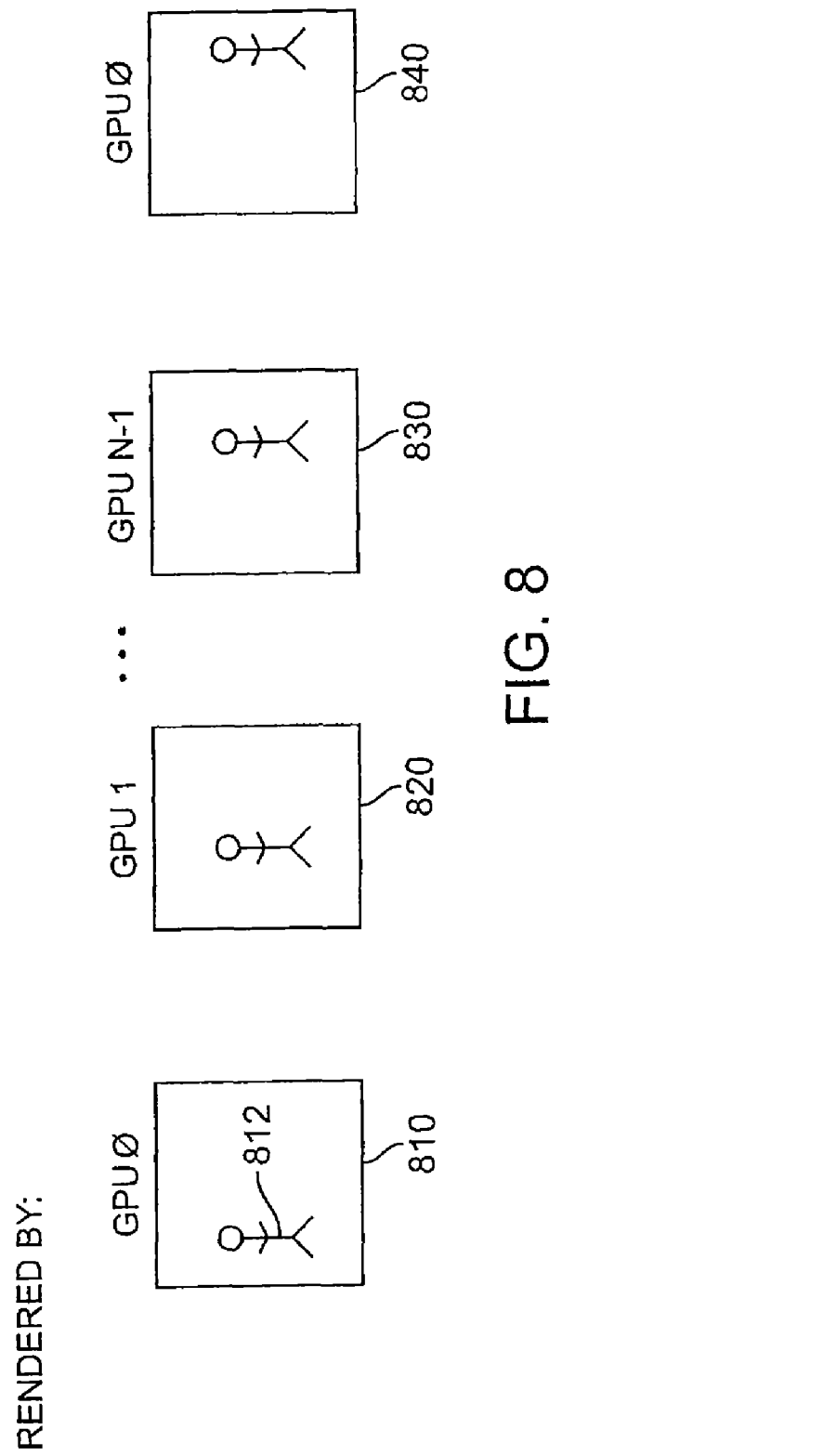
FIG. 8 illustrates a division of processing workload between "N" processors in a graphics system using alternate-frame rendering.

FIG. 8 illustrates the division of processing workload when "N" GPUs are used in alternate frame-rendering. This figure includes a series of frames 810, 820, 830, and 840. Successive frames are rendered by different GPUs. Specifically, GPU0 renders frames 810 and 840, while GPU1 renders frame 820, and GPU(n−1) renders frame 730. An example of the timing used to render and display frames in alternate-frame where two GPUs are used is shown in the next figure.

Figure 9:
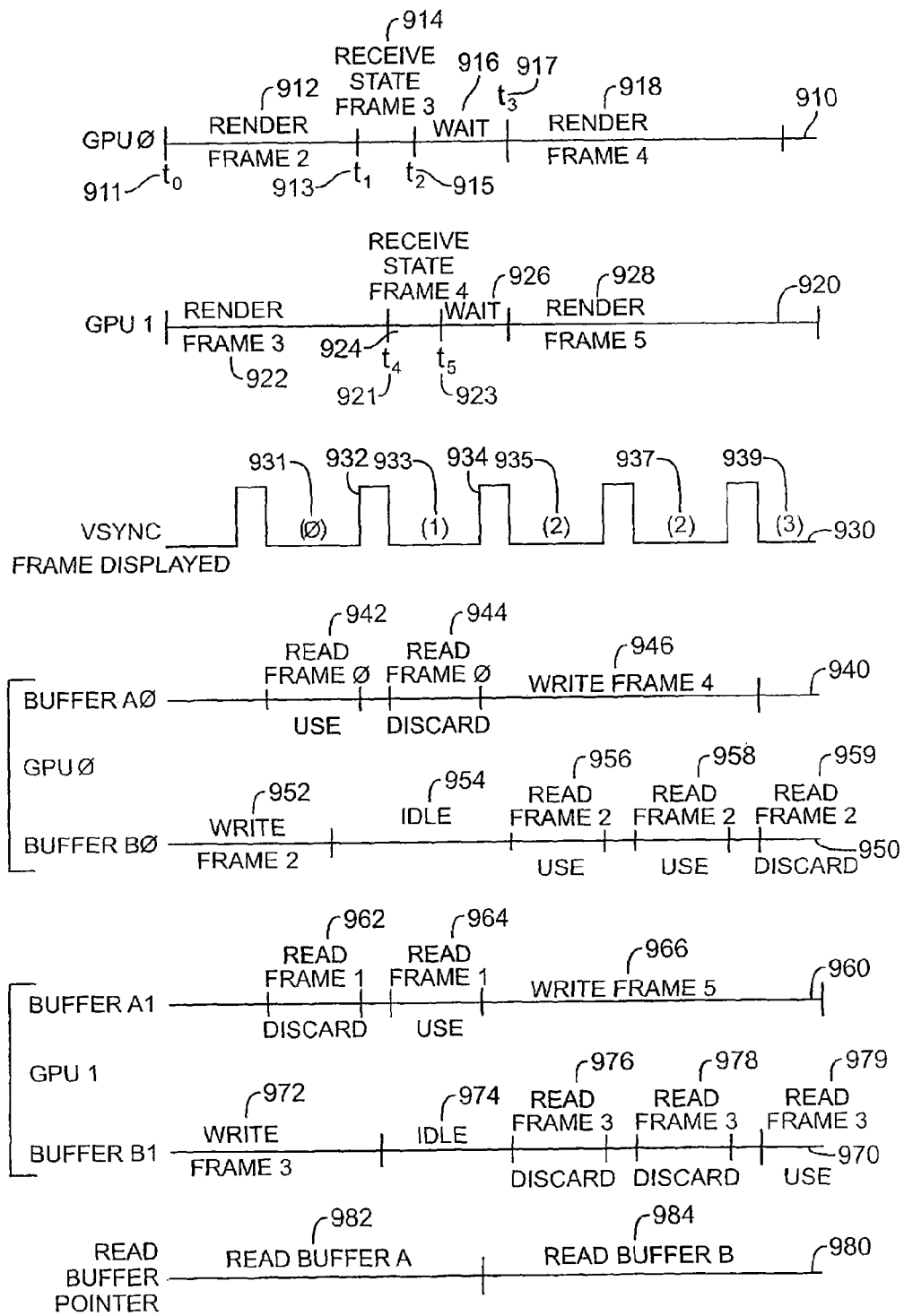
FIG. 9 is a timing diagram illustrating the operation of a graphics system consistent with an embodiment of the present invention operating in an alternate-frame rendering mode.

FIG. 9 is a timing diagram illustrating the operation of a graphics system consistent with an embodiment of the present invention. In this example, the system is operating in an alternate-frame rendering mode. This figure includes functions performed by GPU0 as timeline 910, and the functions performed by GPU1 are shown as timeline 920. Also included is a vertical blanking or vertical synchronizing signal VSYNC 930, as well as the operations performed by front and back buffers used by the two GPUs. The operations of the two buffers used by GPU0 are illustrated as timelines 940 and 950, while the operations of the buffers used by GPU1 are shown as timelines 960 and 970. Also shown is the state of a read buffer pointer 980, which shows the set of buffers that are read from to generate an image by a scanout engine.

In this example, GPU0 renders frame F2 during time 912, and GPU 1 renders frame F3 during time 922. After these frames have been rendered, the next frames, specifically frame F4 and frame F5 can be rendered. However, because GPU0 is not rendering frame F3, GPU0 may miss state update commands that are included in frame F3 commands. Similarly, since GPU1 renders frame F3 then frame F5, any state update included in frame F4 may be missed by GPU1. Accordingly, GPU0 receives the state update in frame F3 during time 914, and GPU1 receives state updates in frame F4 during time 924. More details on this may be found in co-pending United States patent application number 11/264,828, filed Oct. 31, 2005, which is hereby incorporated by reference.

Accordingly, GPU0 renders frame F2 during times 912, then receives state updates for frame F3 during time 914. Similarly, GPU1 renders frame F3 during time 922 and receives state updates for frame F4 during time 924. At time T4 921, each GPU has completed rendering its frame. Accordingly, at the next vertical sync rising edge 934, the buffers are flipped, as they were in the SFR example shown in FIG. 4.

During times 942 and 944, buffer A0 is read. Specifically, frame 0 is read during these times. Similarly, buffer A1 is read during times 962 and 964. During time 942, frame 0 is read and used, while during time 944, frame 0 is read from buffer A0 but is discarded or not used. Similarly, during time 962, frame F1 is read from buffer A1 and not used, while during time 964, frame F1 is read from buffer A1 and displayed.

After the buffer flip at time T3 917, data is written to buffer A0 and buffer A1. Similarly, frames F2 and F3 are read from buffer B0 and B1. Specifically, during time 956, frame F2 is read and used from buffer B0, while during time 978, frame F3 is read and used from buffer B1.

In this example, one or more GPUs spend a portion of their time rendering a frame, a portion receiving state updates for frames that they are not rendering, and an amount of time waiting for a buffer flip to occur. Specifically, GPU0 renders frame F2 during time 912, then receives state updates for frame F3 during time 914, and waits for a buffer to write to during time 916. The portion of time that a GPU renders as compared to the cumulative time of rendering, receiving state updates, and waiting, may be referred to as that processor's efficiency. Similarly, GPU1 renders frame F3 during time 922, receives state updates for frame F4 during time 924, and waits for a buffer to become available following a buffer flip during time 926. Again, the time spent rendering 922 as compared to the sum of times 922, 924, and 926, may be considered the efficiency of GPU1.

As before, it is desirable to illustrate this efficiency in a graphical manner to users, programmers, and other interested individuals. Other information that may be of interest includes the number of frames-per-second generated by the GPUs, cumulative efficiency of the GPUS taken together, or other information.

Figure 10:
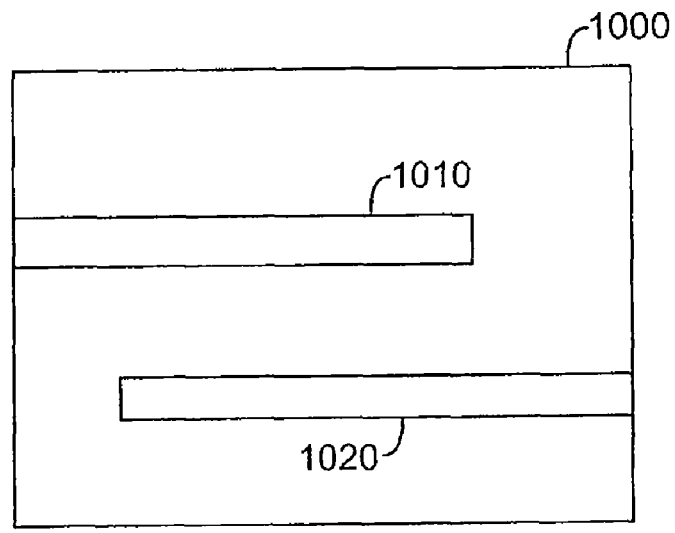
FIG. 10 illustrates a method of graphically representing an improvement in an alternate-frame rendering graphics system according to an embodiment of the present invention.

FIG. 10 illustrates a method of graphically representing an improvement in an alternate-frame rendering graphics system according to an embodiment of the present invention. Illustrated is a display 1000 including graphical bars 1010 and 1020. The bars may indicate the efficiency at which two graphics processing units are operating. An indication of 100 percent efficiency may be shown by a bar stretching completely across the screen, while lesser percentages may be shown as a bar starting at one end or side of the screen and extending towards the other side of the screen.

Figure 11:
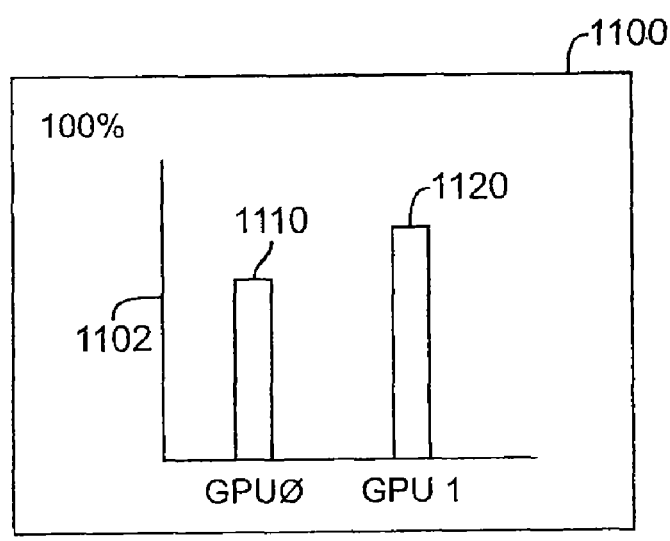
FIG. 11 illustrates a method of graphically representing processor usage according to an embodiment of the present invention.

FIG. 11 illustrates a method of graphically representing processor usage according to an embodiment of the present invention. This figure includes a display 1100 that is displaying a graphic image 1102. The graphic image 1102 indicates the efficiency at which each of two graphics processing units are operating. Each of these examples and the other displayed metrics included may show data for 2, 3, 4, or more graphics processing units in a graphics processing system. Also, this and other information may be displayed in real-time, or in a cumulative or historical manner.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of displaying load-balancing information in a graphics system including a first processor and a second processor, the method comprising:

rendering a first number of lines comprising a first portion of a first frame using the first processor;

rendering a second number of lines comprising a second portion of the first frame using a second processor; and displaying a first graphic image on a second frame, wherein the first graphic image visually designates a division between the first portion of the first frame and the second portion of the first frame.

2. The method of claim 1, wherein the graphic image is a horizontal line on a display, where there are approximately the first number of lines on the display above the horizontal line and approximately the second number of lines on the display below the horizontal line.

3. The method of claim 1 further comprising:

rendering a third number of lines comprising a third portion of a second frame using a first processor;

rendering a fourth number of lines comprising a fourth portion of the second frame using a second processor; and displaying the first graphic image and a second graphic image, the second graphic image visually designating a division between the third portion of the second frame and the fourth portion of the second frame.

4. The method of claim 3, wherein the first processor renders the first number of lines in a first duration and the third number of lines in a second duration and the second processor renders the second number of lines in a third duration and the fourth number of lines in a fourth duration, the method further comprising:

modifying the first number and the second number to generate the third number and the fourth number such that the second duration is approximately equal to the fourth duration.

5. The method of claim 1 further comprising:

displaying a rate at which the first processor and the second processor are rendering frames.

6. The method of claim 5 further comprising:

rendering a second frame using only the first processor; and displaying a rate at which the first processor is rendering frames.

7. The method of claim 1, wherein the first processor and the second processor are graphics processing units.

8. A method of displaying processor utilization in a multiple graphics processor system, the method comprising:

rendering one or more frames using at least a first graphics processor and a second graphics processor;

determining a first utilization of the first graphics processor while rendering the one or more frames;

determining a second utilization of a second graphics processor while rendering the one or more frames; and using the first graphics processor to display the one or more frames and a graphic image showing the utilization of the first and second utilizations processors, wherein the first graphics processor and the second graphics processor each render a portion of each frame in the one or more frames, and wherein the graphic image is a line at least approximately indicating the portion of a frame rendered by each graphics processor.

9. The method of claim 8, wherein the utilization of each graphics processor is based on the percentage of time that the graphics processor is rendering.

10. The method of claim 8, wherein the graphic image further comprises an indication of a frame rate.

* * * * *